US009248781B2

(12) United States Patent  
Oppliger

(10) Patent No.: US 9,248,781 B2
(45) Date of Patent: Feb. 2, 2016

(54) PACKAGING TRAY HAVING INTEGRATED NOISE AND VIBRATION REDUCTION FEATURES

(71) Applicant: Toyota Motor Engineering & Manufacturing North America, Inc., Erlanger, KY (US)

(72) Inventor: Scott Oppliger, New Hudson, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 8 days.

(21) Appl. No.: 14/247,722

(22) Filed: Apr. 8, 2014

(65) Prior Publication Data

US 2015/0283948 A1  Oct. 8, 2015

(51) Int. Cl.
*B60N 3/00* (2006.01)
*B60R 5/04* (2006.01)

(52) U.S. Cl.
CPC ..................... *B60R 5/044* (2013.01)

(58) Field of Classification Search
CPC ............ A61B 19/026; A61B 19/0271; A61B 2019/0278; A61B 19/08; A61M 25/002; B60R 7/04; B60R 2011/0007; B60R 16/023; B60K 1/04; B60J 2/145
USPC .................. 293/24.43, 37.16, 24.34; 224/275
See application file for complete search history.

(56) References Cited

U.S. PATENT DOCUMENTS

| 3,993,345 | A | * | 11/1976 | Croup | B60R 11/0217 181/150 |
| 4,206,830 | A | * | 6/1980 | Sohma | H04R 1/30 181/141 |
| 4,514,599 | A | * | 4/1985 | Yanagishima | H04R 1/24 381/152 |
| 4,551,849 | A | * | 11/1985 | Kasai | B60R 11/0217 381/152 |
| 4,847,907 | A | * | 7/1989 | Ando | H04R 1/025 381/389 |
| 5,076,631 | A | * | 12/1991 | Lord, Jr. | B60R 13/02 296/37.8 |
| 5,171,054 | A | * | 12/1992 | Wilson | B60R 11/0217 296/193.04 |
| 5,498,050 | A | * | 3/1996 | Maruyama | B60R 5/044 296/37.16 |
| 5,685,591 | A | * | 11/1997 | Simplicean | B60R 11/02 224/275 |
| 5,731,551 | A | * | 3/1998 | Petrucci | H04R 1/025 181/141 |
| 5,813,715 | A | * | 9/1998 | Musukula | B60N 2/0224 296/63 |
| 5,921,605 | A | * | 7/1999 | Musukula | B60N 2/0224 296/63 |

(Continued)

*Primary Examiner* — Kiran B Patel
(74) *Attorney, Agent, or Firm* — Dinsmore & Shohl LLP

(57) ABSTRACT

A packaging tray for an automotive vehicle having a passenger compartment and a cargo area. The cargo area is separated from the passenger compartment by a structural support extending between a rear seat assembly and a rear windshield. The packaging tray includes a first component having interior and exterior surfaces and a second component. The second component includes a base portion and a plurality of standoff portions formed integrally as a one piece structure. An outer surface of the base portion conforms to a shape of the interior surface of the first component. The plurality of standoff portions extend outwardly from an inner surface of the base portion to contact the structural support. The plurality of standoff portions space the base portion apart from the structural support to reduce noise and vibrations from the cargo area entering the passenger compartment.

11 Claims, 6 Drawing Sheets

(56) References Cited

U.S. PATENT DOCUMENTS

| | | | |
|---|---|---|---|
| 5,964,491 A * | 10/1999 | Marsh | B60R 5/044 |
| | | | 224/275 |
| 5,979,962 A | 11/1999 | Valentin et al. | |
| 6,258,438 B1 * | 7/2001 | Loveland | B32B 5/26 |
| | | | 181/141 |
| 6,926,784 B2 | 8/2005 | Bock | |
| 6,971,475 B2 | 12/2005 | Tompson et al. | |
| 7,080,712 B2 | 7/2006 | Tsuiki et al. | |
| 7,182,172 B2 | 2/2007 | Albin, Jr. | |
| 7,267,386 B2 | 9/2007 | Hesch | |
| 7,410,208 B2 * | 8/2008 | Kim | B60R 11/0217 |
| | | | 296/193.08 |
| 7,503,429 B2 | 3/2009 | Boyce | |
| 7,677,353 B2 * | 3/2010 | Shinohara | H04R 1/288 |
| | | | 181/150 |
| 7,845,705 B2 | 12/2010 | Meyer | |
| 8,123,178 B2 | 2/2012 | Yoshida | |
| 8,184,847 B2 * | 5/2012 | Bertoli | H04R 1/025 |
| | | | 296/186.3 |
| 8,628,133 B2 | 1/2014 | Honda et al. | |
| 8,827,342 B2 * | 9/2014 | Kuroda | B60R 13/08 |
| | | | 296/37.16 |

\* cited by examiner

PACKAGING TRAY HAVING INTEGRATED NOISE AND VIBRATION REDUCTION FEATURES

FIELD OF THE INVENTION

The present invention is directed to a packaging tray for an automotive vehicle, more particularly, a packaging tray having integrated noise and vibration reduction features.

BACKGROUND OF THE INVENTION

Modern automotive vehicles have put an increased focus on isolation of the passenger compartment from noise and vibrations. Previously it has been known to provide insulation in boundaries between the passenger compartment and cargo areas to dampen noise and vibration. However, the addition of insulation increases the number of parts required for assembly, thereby, increasing the assembly time of the automotive vehicle, which consequently increases the overall cost.

It has been known in the art to provide assemblies that are provided over a structural support extending between a rear seat assembly and the rear windshield with insulation against noise and vibration. As seen in FIGS. 7A and 7B, the previously known assemblies 10' include a substrate 12' and a separate mat 14' which is provided on the structural support 16' that defines a barrier between the passenger compartment and the cargo area (trunk space). Once the mat 14' is placed on the structural support 16' a plurality of individual spacers 18' are then provided on top of the mat 14' to space apart the substrate 12' from the structural support 16'.

However, the previously known assembly 10' requires the installation of multiple parts which increases the assembly time required for the automotive vehicle. Moreover, the increase in the number of parts increases the overall cost of the parts. Increased assembly time and part cost consequently increases the overall assembly cost of the automotive vehicle. Further, the previously known assemblies leave room for additional improvement in the prevention of noise and vibrations, such as roars and exhaust noise, of the cargo areas from entering into the passenger compartment.

Thus, there exists a need in the art for a packaging tray which reduces the required assembly time, the number of assembly parts, and the overall weight and cost, while providing an increase in the prevention of noise and vibrations from entering into the passenger compartment.

SUMMARY OF THE INVENTION

The present invention provides a packaging tray that reduces noise and vibration from creeping between a cargo area and a passenger compartment of an automotive vehicle, and which overcomes the above mentioned disadvantages of the previously known packaging trays. By providing the packaging tray and a silencer pad, formed with integrally formed standoff portions, which have corresponding conformal surfaces, noise and vibration are reduced. In addition, the overall number of parts required for the installation of the packaging tray is reduced.

In brief, a packaging tray adapted for use in an automotive vehicle having a passenger compartment and a cargo area is provided. The passenger compartment includes a rear seat assembly and a rear windshield. The cargo area is separated from the passenger compartment by a structural support extending between the rear seat assembly and the rear windshield. The packaging tray includes a first component and a second component.

The first component includes an exterior surface and an opposite interior surface. The exterior surface faces the passenger compartment. The second component includes a base portion and a plurality of standoff portions. The base portion and the plurality of standoff portions are formed integrally as a one piece structure. The base portion has an outer surface and an opposite inner surface. The outer surface of the base portion conforms to a shape of the interior surface of the first component.

The plurality of standoff portions extend outwardly from the inner surface of the base portion to contact the structural support. The plurality of standoff portions space the inner surface of the base portion apart from the structural support to reduce noise and vibrations from the cargo area entering the passenger compartment.

BRIEF DESCRIPTION OF THE DRAWINGS

A better understanding of the present invention will be had upon reference to the following detailed description when read in conjunction with the accompanying drawings wherein like reference characters refer to like parts throughout the several views and in which.

DETAILED DESCRIPTION OF THE INVENTION

The present invention has utility as a packaging tray which provides a reduction in noise and vibrations, emanating from a cargo area, from entering into the passenger compartment. By providing the packaging tray with a silencer pad having a base portion and a plurality of standoff portions integrally formed as a one piece structure, the total number of parts and assembly time of the packaging tray can be reduced. Further, by forming the silencer pad as a pourable foam that is molded onto the interior surface of the packaging tray, the outer surface of the silencer pad conforms in shape to the interior surface of the packaging tray which increases the noise and vibration abatement properties of the silencer pad.

Figure 1:
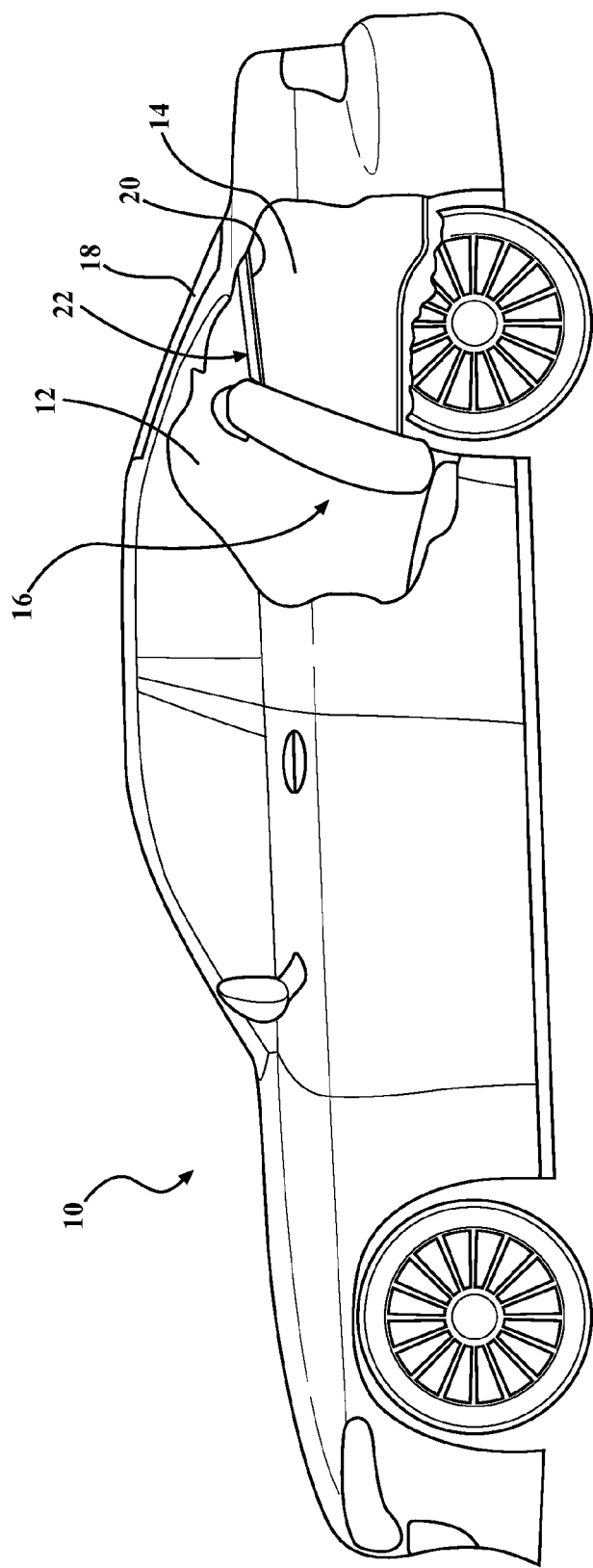
FIG. 1 is a side view of an automotive vehicle illustrating the placement of the packaging tray between the rear seat assembly and the rear windshield.

With reference to FIG. 1, an automotive vehicle is generally illustrated at 10. The automotive vehicle 10 includes a passenger compartment 12 and a cargo area 14 (i.e., trunk space). A rear seat assembly 16 is provided in the passenger compartment 12. Positioned rearward of the rear seat assembly 16 is a rear windshield 18. Extending between the rear seat assembly 16 and the rear windshield 18 is a structural support 20. The structural support 20 defines a barrier between the passenger compartment 12 and the cargo area 14.

The inventive packaging tray 22 is provided on the structural support 20 on the passenger compartment 12 side of the structural support 20. The inventive packaging tray 22 provides an increase in the reduction of the transmission of noise and vibration from the cargo area 14 into the passenger compartment 12.

Figure 2:
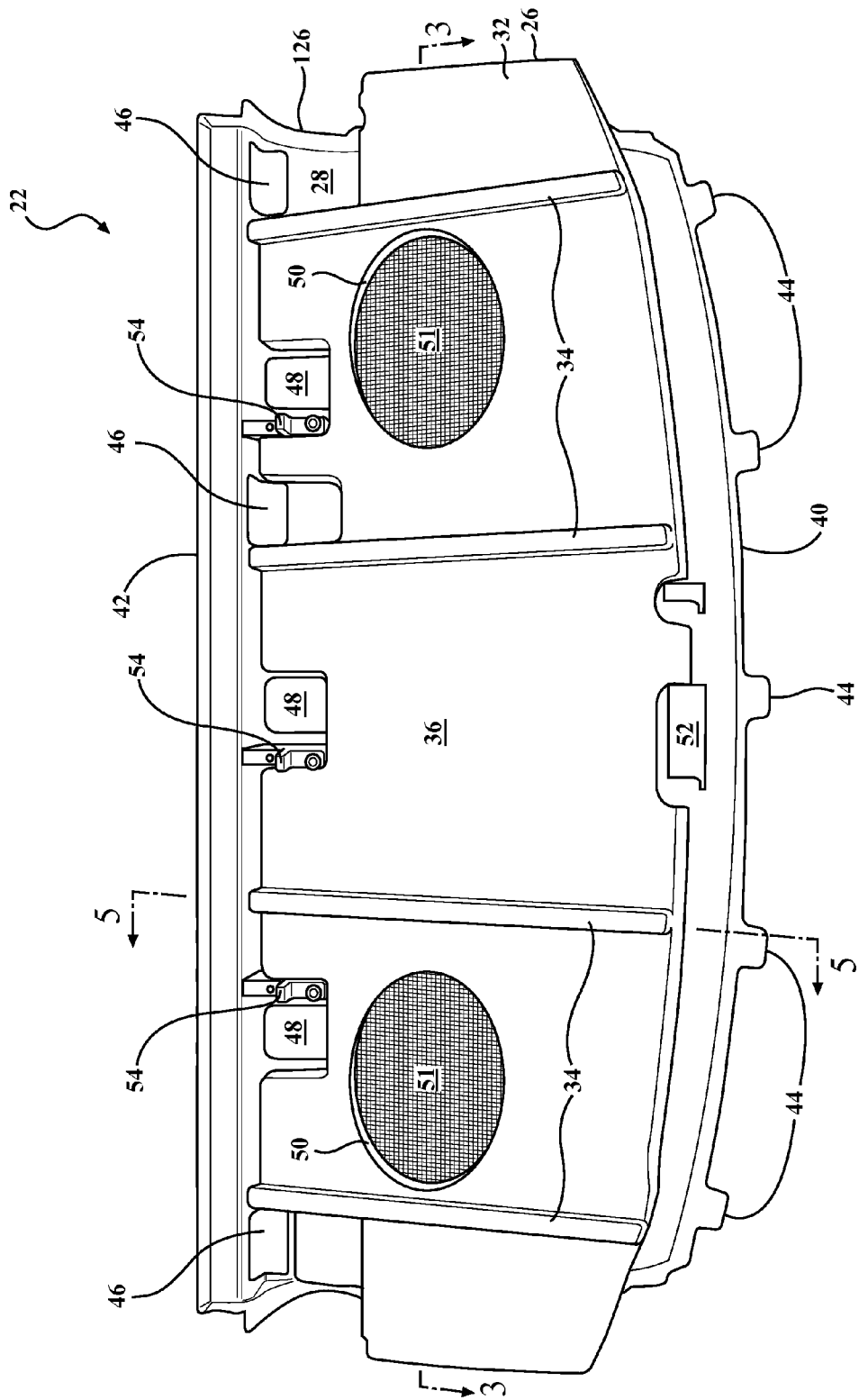
FIG. 2 is a bottom view of the inventive packaging tray.
Figure 3:
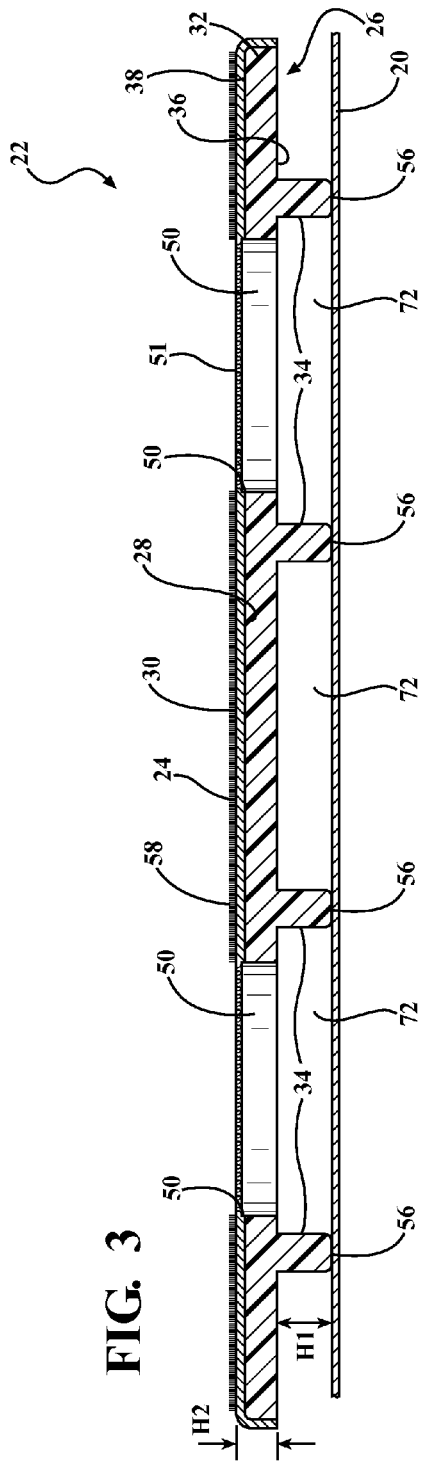
FIG. 3 is a cross-sectional view taken along line 3-3 of FIG. 2.

As seen in FIGS. 2 and 3, the inventive packaging tray 22 is formed of a two component structure; specifically, the packaging tray 22 includes a substrate 24 and a silencer pad 26. The substrate 24 includes an interior surface 28 and an opposite exterior surface 30. Upon installation of the packaging tray 22 to the structural support 20, the interior surface 28 faces the structural support 20 and the exterior surface 30 faces the passenger compartment 12.

When the packaging tray 22 is installed, the silencer pad 26 is interposed between the structural support 20 and the substrate 24. The silencer pad 26 is formed having a base portion 32 and a plurality of standoff portions 34. As described in greater detail below, the base portion 32 and the plurality of standoff portions 34 are formed as a unitary one piece monolithic structure. Specifically defined, the silencer pad 26 is a unitary structure in which the base portion 32 is integrally formed as one piece with the plurality of standoff portions 34.

The base portion 32 includes an inner surface 36 and an opposite outer surface 38. Upon installation of the packaging tray 22 to the structural support 20, the inner surface 36 faces the structural support 20 and the outer surface 38, which is in contact with the interior surface 28 of the substrate 24, and faces the passenger compartment 12. As will be described in greater detail below, the outer surface 38 is formed so as to conform to the contours of the interior surface 28 of the substrate 24.

In the illustrated embodiment, the substrate 24 is formed as a rigid substrate composed of a thermally formed polymer material. Specifically, the substrate 24 is formed of a plastic material which undergoes a heating operation to be formed into the shape of the substrate 24. Although the substrate 24 is not limited to such a configuration, an example formation of the substrate 24 includes recycled plastic material, such as plastic bottles, which undergoes a steam heating operation to melt the shredded recycled material into the shape of the substrate 24.

The substrate 24 is formed having a generally arcuate or curved rear side 40 and a generally linear front side 42. The rear side 40 and front side 42 are provided on front and rear sides of the substrate 24 with respect to a vehicle longitudinal direction. The rear side 40 is provided with a generally curved shape so as to conform to the edge of the rear windshield 18, and the front side 42 is provided with a generally linear shape which conforms to a rear side surface of the rear seat assembly 16. A plurality of tabs 44 are provided at the rear side 40 of the substrate 24. The tabs 44 engage with corresponding slots (not shown) formed in the structural support 20 to retain the rear side 40 of the substrate 24 to the structural support 20 upon installation of the packaging tray 22.

Adjacent the front side 42 of the substrate 24 are a plurality of shoulder strap guide cutouts 46 which receive shoulder strap guides for a seatbelt system of the rear seat assembly 16. Positioned between the shoulder strap guide cutouts 46 are a plurality of child restraint anchor cutouts 48 which receive child support anchors used to secure child supports, such as infant or toddler car seat anchoring systems, to the rear seat assembly 16.

The packaging tray 22 further includes apertures 50 formed in both the substrate 24 and the base portion 32 of the silencer pad 26. The apertures 50 allow for the installation of speakers (not shown) and speaker screens 51 into the packaging tray 22. Further, a lamp cutout 52 is provided adjacent the rear side 40 of the substrate 24 to allow for the installation of a center high mount stop lamp (not shown) into the packaging tray 22. Although the shoulder strap guide cutouts 46, the child restraint anchor cutouts 48, and the lamp cutout 52 are only provided in the substrate 24 in the illustrated embodiment, it is understood that corresponding cutouts are optionally formed into the base portion 32 of the silencer pad 26. It is appreciated, of course, that the speakers (not shown) and speaker screens 51, the shoulder strap guide cutouts 46, the child restraint anchor cutouts 48, and the lamp cutout 52 are considered accessories to the packaging tray.

As clearly seen in FIG. 2, a portion of the substrate 24 adjacent the front end 42 is formed having a step-like shape so as to provide an overlap of the rear seat assembly 16 with the packaging tray 22 to provide an aesthetically pleasing appearance of the passenger compartment 12 of the automotive vehicle 10.

In order to secure the front side 42 of the substrate 24 to the structural support 20, a plurality of connectors 54 are provided on the substrate 24 adjacent the front side 42. The plurality of connectors 54 optionally include snap fit tabs which frictionally engage with corresponding holes (not shown) formed in the structural support 20. Although in the illustrated embodiment the plurality of connectors 54 are provided adjacent the front side 42 of the substrate 24, it is appreciated, of course, that the position of the connectors 54 is not limited thereto.

The packaging tray 22 is secured to the structural support 20 at a rear side 40 due to the engagement of the plurality of tabs 44 with the corresponding slots (not shown) in the structural support 20, and the front side 42 of the substrate 24 is secured to the structural support 20 due to the engagement of the snap tabs of the connectors 54 to the corresponding holes (not shown) formed in the structural support 20.

With reference to FIG. 3, the plurality of standoff portions 34, which are formed integrally as one piece with the base portion 32, extend outwardly from the inner surface 36 of the base portion 32 to an upper surface of the structural support 20. Specifically, distal ends 56 of the standoff portions 34 contact the upper surface of the structural support 20.

The standoff portions 34 are optionally formed to have a height H1 that is greater than a height H2 of the base portion 32. The height H1 of the standoff portions 34 is measured from the distal end 56 to the inner surface 36 of the base portion 32, and the height H2 of the base portion 32 is measured from the inner surface 36 to the outer surface 38 of the base portion 32.

Upon installation of the packaging tray 22, the plurality of standoff portions 34 undergo deformation due to the contact of the distal ends 56 with the upper surface of the structural support 20. Specifically, the standoff portions 34 are formed such that the height H1 of the standoff portions 34 prior to installation of the packaging tray 22 is greater than the height H1 of the standoff portions after the installation of the packaging tray 22 to the structural support 20.

As seen in FIG. 3, an exterior layer 58 is provided on the exterior surface 30 of the substrate 24. The exterior layer 58 is a covering having a surface texturing such as a carpet, fabric, film, foils, suede, natural or faux leather. The exterior layer 58 provides an aesthetically pleasing appearance of the packaging tray 22 to the passenger compartment 12 as the exterior layer 58 is the portion of the packaging tray 22 that is open to the passenger compartment 22.

The silencer pad 26 is integrally formed with the base portion 32 and the plurality of standoff portions 34 formed as a one piece monolithic structure. Also, the entire silencer pad 26 is formed of a polymer illustratively including, but not limited to, a thermo-formable foam, a light weight pourable foam, a polyurethane, or an open celled foam or molded fiber.

Figure 4:
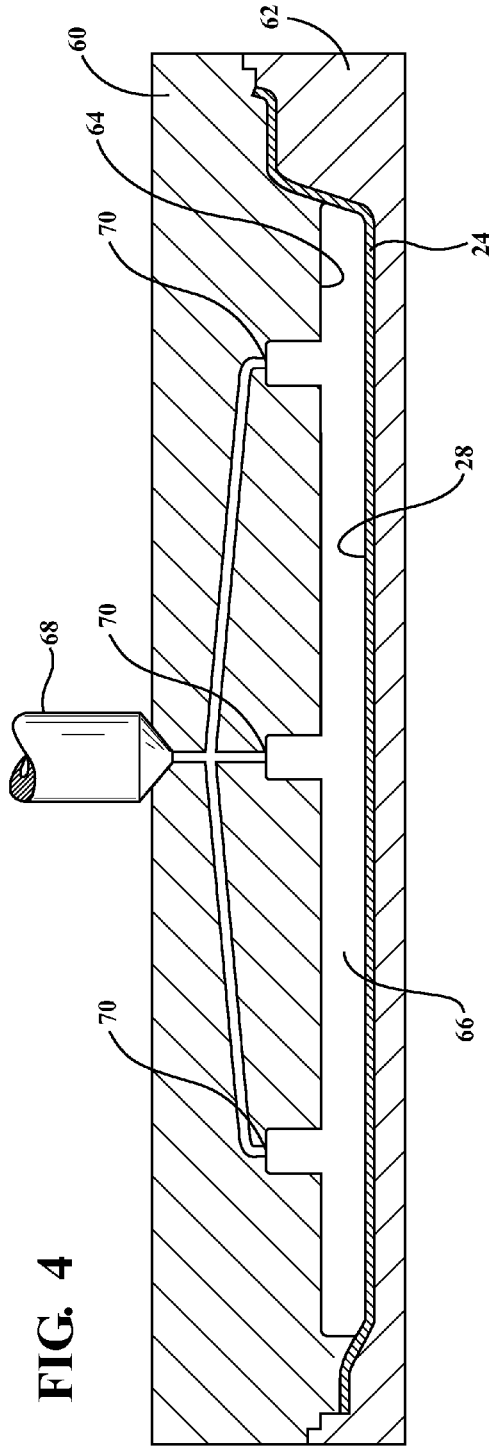
FIG. 4 is a partial cross-sectional view illustrating the formation of the silencer pad having the integrated base portion and standoff portions onto the packaging tray.

Specifically, as seen in FIG. 4, an upper mold 60 is provided facing the interior surface 28 of the inverted substrate 24 and a lower mold 62 is provided on the exterior surface 30 of the substrate 24. The inner surface 64 of the upper mold 60 is shaped so as to define the contours of the inner surface 36 of the base portion 32 and the plurality of standoff portions 34. A cavity 66 is formed between the inner surface 64 of the upper mold 60 and the interior surface 28 of the substrate 24. The foam material is poured in through a dispenser 68 into apertures 70 at the inner surface 64 of the upper mold 60. The foam is allowed to expand to fill the cavity 66 formed by the substrate 24 and the upper mold 60. As the cavity 66 defines the shape of the silencer pad 26, formation of the silencer pad 26 within the cavity 66 forms the base portion 32 and the plurality of standoff portions 34 integrally as a one piece monolithic structure.

By forming the silencer pad 26 of a polymer such as a pourable foam, the exterior surface 30 of the silencer pad 26 is formed to correspond to the contours and shape of the interior surface 28 of the substrate 24. The elimination of any gaps due to the silencer pad 26 being formed directly onto the interior surface 28 of the substrate 24 reduces the transmission of noise and vibration into the passenger compartment 12.

The formation of the plurality of standoff portions 34 integrally as one piece with the base portion 32 further reduces the transmission of noise and vibration from the cargo area 14 into the passenger compartment 12. Specifically, as the silencer pad 26 is formed of an open cell foam material and the standoff portions 34 extend from the inner surface 36 of the base portion 32 and contact the upper surface of the structural support 20. Upon installation of the packaging tray 22, the standoff portions 34 are slightly deformed against the structural support 20. As such, vibrations of the structural support 20 are absorbed and dampened by the plurality of standoff portions 34.

As seen in FIGS. 2 and 3, the plurality of standoff portions 34 are formed as spaced apart and parallel elongations that extend in the vehicle longitudinal direction. As such, channels 72 are formed between adjacent standoff portions 34. Although in the illustrated embodiment, the standoff portions 34 are depicted as extending parallel to the longitudinal direction of the vehicle 10, the orientation of the standoff portions 34 is not limited thereto. Specifically, the standoff portions 34 optionally extend parallel to a width direction of the vehicle, or in a direction oblique to the longitudinal or width direction. Further, the standoff portions 34 are optionally provided with a length that is greater than the height H1.

The channels 72 function as baffles in which noise emanating from the cargo area 14 is absorbed and dampened by the plurality of standoff portions 34, the channels 72 extending between the plurality of standoff portions 34 and the base portion 32. Specifically, it is the formation of the silencer pad 26 of a polymer material, specifically the open cell foam material, which allows for the absorption and dampening of noise and vibrations from the cargo area 14 to be suppressed from entering the passenger compartment 12.

Figure 5A:
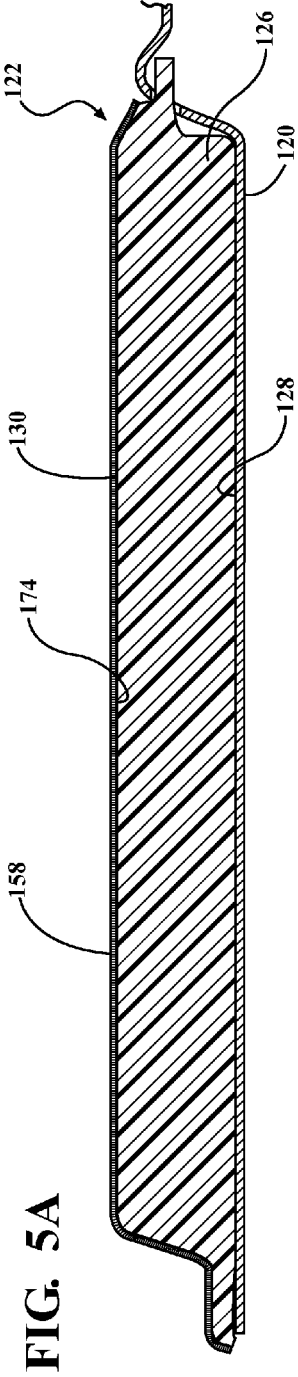
FIG. 5A is a modified cross-sectional view taken along line 5-5 of FIG. 2 illustrating an alternative embodiment of the invention.

With reference to FIG. 5A, an alternative embodiment of the packaging tray is generally illustrated at 122. The packaging tray 122 includes a silencer pad 126 and an exterior layer 158. The packaging tray 122 is formed without the substrate 24 provided between the silencer pad 126 and the exterior layer 158. As such, during formation of the silencer pad 126, the polymer material (pourable foam) is poured into a cavity formed by a mold and the exterior layer 158. Further, the silencer pad 126 of the packaging tray 122 is formed to fill the entire space between the exterior surface 158 and the structural support 120 that is the silencer pad 126 is not formed with standoff portions. Specifically, the entire interior surface 128 of the silencer pad 126 contacts the upper surface of the structural support 120. As such, the exterior surface 130 of the silencer pad 126 conforms to the shape and contours of an interior surface of the exterior layer 158, and the interior surface 128 of the silencer pad 126 conforms to the shape and contours of the upper surface of the structural support 120.

The silencer pad 126 is formed of a pourable or injectable two component polyurethane based foam. Alternatively, the silencer pad 126 is optionally formed of a thermal formable slab of polyurethane based foam, or utilizing expanders such as polypropylene, polyethylene, or polystyrene or blends thereof.

The exterior layer 158 is formed of polypropylene or polypropylene and talc in an injection molding process. Alternatively, the exterior layer 158 is optionally formed of polypropylene with natural or glass fibers or a polyethylene terephthalate and fiber blend in a thermal forming process. Further still, the exterior layer 158 is optionally formed in a thermal setting process using compression molds in which a thermal setting adhesive bonds a mix of polyethylene terephthalate fibers and natural, glass or other fiber blends.

Figure 5B:
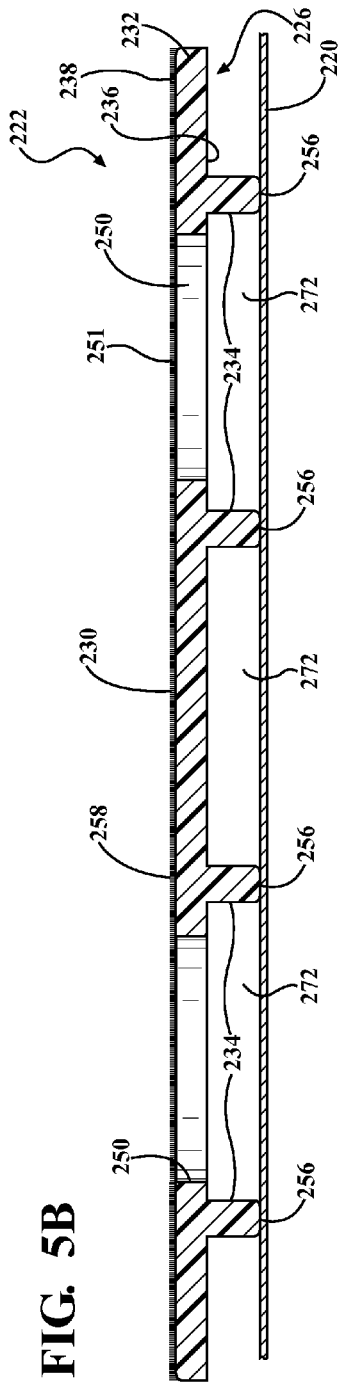
FIG. 5B is another modified cross-sectional view taken along line 5-5 of FIG. 2 illustrating an alternative embodiment of the invention.
Figure 7B:
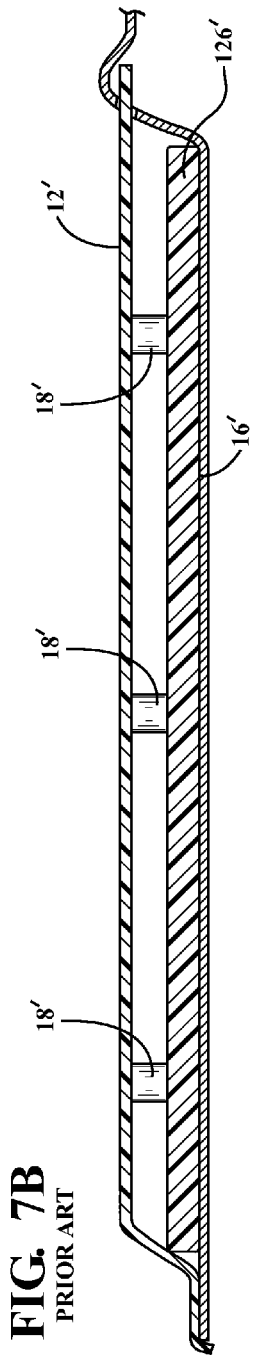
FIG. 7B is a partial cross-sectional view, of the previously known packaging trays, taken along line 7B-7B of FIG. 7A.

With reference to FIG. 5B, another alternative embodiment of the packaging tray is generally illustrated at 222. The packaging tray 222 includes a silencer pad 226 and an exterior layer 258 formed directly on the silencer pad 226 without an intervening substrate. As the packaging tray 222 is formed without the substrate, the outer surface 238 of the silencer pad 226 conforms to the shape and contours of an interior surface of the exterior layer 158. The exterior layer 258 is formed of a carpet, felt, or another fabric composite.

In the embodiment illustrated in FIG. 5B, the packaging tray 222 is similar to the packaging tray 22 except for the substrate 24. Specifically, the silencer pad 226 is formed with a base portion 232 and a plurality of standoff portions 234 that extend generally normal from the inner surface 236 of the base portion 232. The distal ends 256 of the plurality of standoff portions 234 contact the structural support 220, and form channels 272 between the plurality of standoff portions 234. The channels 272 act as baffles to dampen vibrations and absorb noises.

The silencer pad 226 of the packaging tray 222 is formed of molded fibers, such as natural, glass or blends thereof, in a fiber injection process. Alternatively, the silencer pad 226 is optionally formed from molded polyethylene terephthalate fiber mats which are molded into shape using steam heating or hot air heating. Further still, the silencer pad 226 is optionally formed of a blend of molded fiber and recycled products, such as chopped polyurethane, bonded with a thermally active adhesive. In such a process, the adhesive, the chopped polyurethane and the fibers are pre-blended and introduced into a mold. The adhesive is activated by the heat from steam or hot air that is introduced into or surrounding the mold. In a further alternative, the silencer pad 226 is formed of a two component polyurethane foam or utilizing expanders such as polypropylene, polyethylene, or polystyrene or blends thereof.

It is appreciated of course, that the formation processes and materials for the silencer pads 126 and 226 and the exterior layers 158 and 258 are optionally utilized in the formation of the silencer pad 26 and the exterior layer 58.

Figure 6:
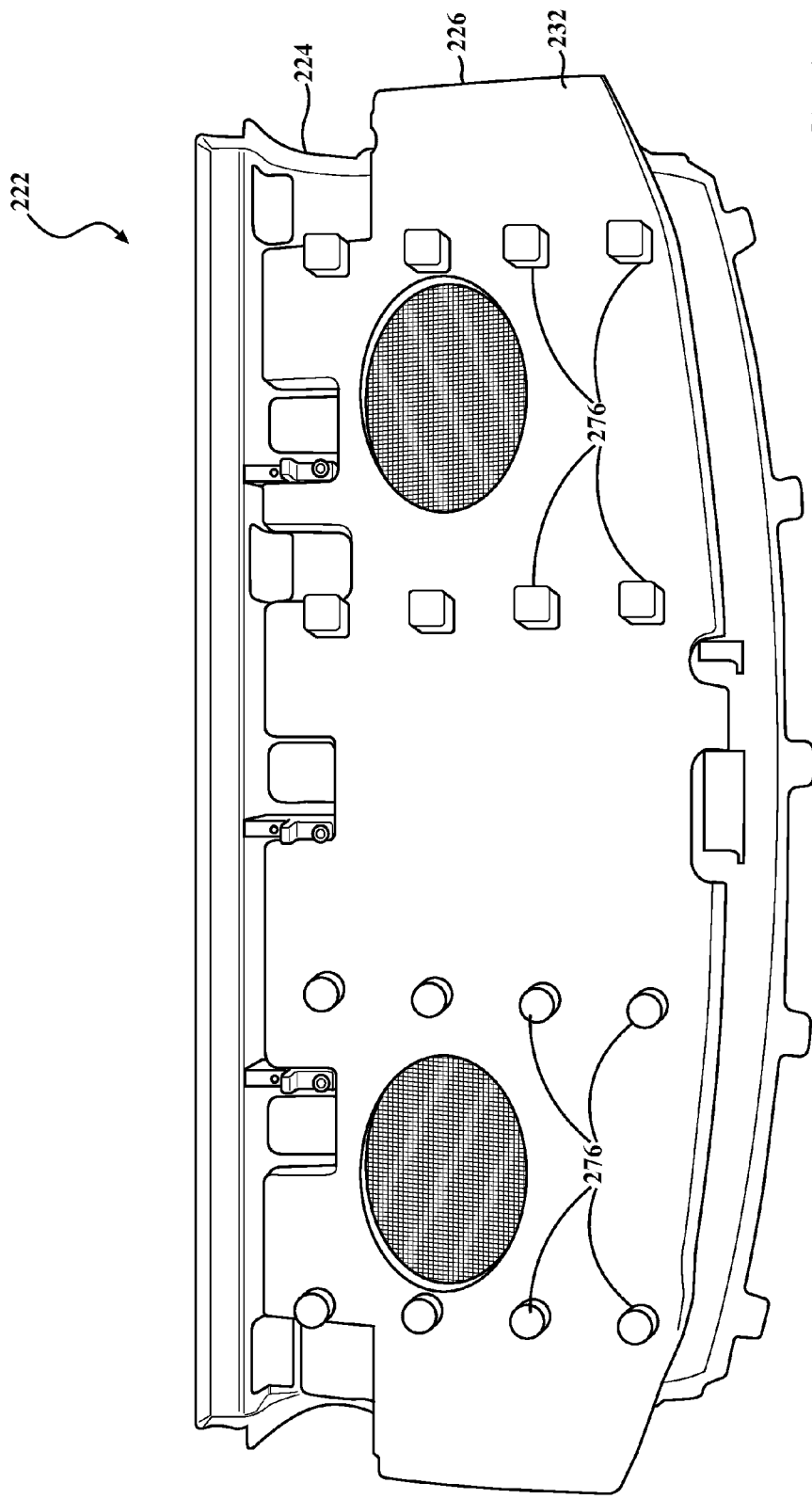
FIG. 6 is a modified bottom view of the packaging tray illustrating another alternative embodiment of the invention.
Figure 7A:
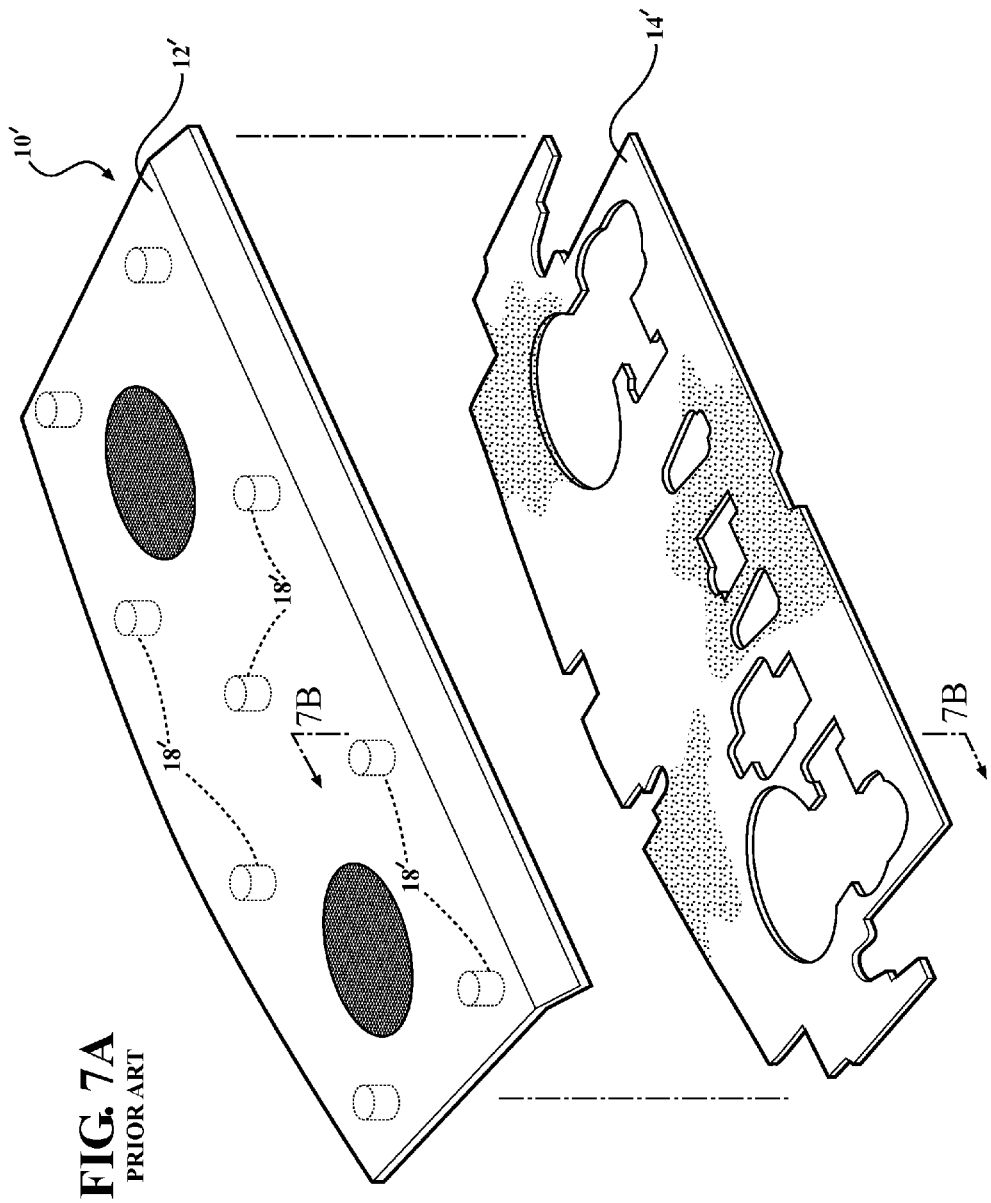
FIG. 7A is an exploded view illustrating the previously known packaging trays.

With reference to FIG. 6, another alternative embodiment of the packaging tray is generally illustrated at 222. The packaging tray 222 is formed similar to the packaging tray 22 in which a substrate 224 and a silencer pad 226 having a base portion 232 and a plurality of standoff portions. The difference between the packaging tray 222 and the packaging tray 22 is the shape of the plurality of standoff portions. As seen in FIG. 6, the standoff portions are provided as a plurality of individual standoff portions 276 having various shapes including regular geometric cross-sectional shapes such as circular, rectangular, triangular, diamond or any other polygon shape. However, the shape of the standoff portions 276 is not limited to such shapes.

The invention is not restricted to the illustrated examples and embodiments described above. The embodiments are not intended as limitations on the scope of the invention. Methods, apparatus, compositions, and the like described herein are exemplary in nature and are not intended as limitations on the scope of the claims. Changes therein and other uses will occur to those skilled in the art. The scope of the invention is defined by the scope of the appended claims and all equivalents thereof.

It is claimed:

1. A packaging tray adapted for use in an automotive vehicle having a passenger compartment and a cargo area, the passenger compartment having a rear seat assembly and a rear windshield, the cargo area separated from the passenger compartment by a structural support extending between the rear seat assembly and the rear windshield, said packaging tray comprising:
   a first component having an exterior surface and an opposite interior surface, said exterior surface facing the passenger compartment; and
   a second component having a base portion and a plurality of standoff portions formed integrally as a one piece structure, the base portion having an outer surface and an opposite inner surface, said outer surface of said base portion conforms to a shape of the interior surface of said first component, said plurality of standoff portions extend outwardly from said inner surface of said base portion to contact the structural support, said plurality of standoff portions spacing said inner surface of said base portion apart from the structural support to reduce noise and vibration from the cargo area entering the passenger compartment.

2. The packaging tray of claim 1, wherein said exterior surface of said first component includes a surface texturing, and wherein said exterior surface is open to the passenger compartment.

3. The packaging tray of claim 1, wherein said plurality of integrally formed standoffs are deformed upon contact with the structural support to provide noise and vibration absorption.

4. The packaging tray of claim 3, wherein said first component is a rigid substrate.

5. The packaging tray of claim 4 further comprising an exterior layer positioned on said exterior surface of said first component, said exterior layer having a textured surface and said exterior layer open to the passenger compartment.

6. The packaging tray of claim 5, wherein each of said plurality of standoff portions having a height that is greater than a height of said base portion.

7. The packaging tray of claim 4, wherein said plurality of standoffs extend parallel to a longitudinal direction of the automotive vehicle.

8. The packaging tray of claim 7, wherein said first component and said second component are formed with a plurality of corresponding apertures for receiving accessories.

9. The packaging tray of claim 8, wherein each of said plurality of apertures are positioned between adjacent standoffs.

10. The packaging tray of claim 1, wherein said second component is formed of a polymer material.

11. The packaging tray of claim 10, wherein the second component is formed of an open cell foam material.

* * * * *